United States Patent
Gielda et al.

(10) Patent No.: US 9,550,407 B2
(45) Date of Patent: Jan. 24, 2017

(54) HVAC INTEGRATED ROOF FOR OPERATOR CABS

(71) Applicant: Caterpillar Inc., Peoria, IL (US)

(72) Inventors: Matthew J. Gielda, Peoria, IL (US); Jeffrey A. Zurinski, Oglesby, IL (US); Alexa E. Davis, Metamora, IL (US); Aaron L. Dunaway, Brimfield, IL (US); Christian D. Ritchie, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/887,344

(22) Filed: Oct. 20, 2015

(65) Prior Publication Data

US 2016/0039262 A1    Feb. 11, 2016

(51) Int. Cl.
*B62D 33/06*    (2006.01)
*B60H 1/00*     (2006.01)

(52) U.S. Cl.
CPC ...... *B60H 1/00207* (2013.01); *B60H 1/00378* (2013.01); *B62D 33/0617* (2013.01); *B60H 2001/00235* (2013.01)

(58) Field of Classification Search
CPC ............ B60H 1/00378; B60H 1/00207; B60H 2001/00235; B62D 33/0617
USPC ........................ 296/210, 190.08, 190.09, 213
See application file for complete search history.

(56) References Cited

U.S. PATENT DOCUMENTS

| | | | |
|---|---|---|---|
| 3,670,808 A | | 6/1972 | Wait, Jr. |
| 4,503,749 A | * | 3/1985 | Kuhn ................. B60H 1/00378 |
| | | | 454/136 |
| 6,339,934 B1 | | 1/2002 | Yoon et al. |
| 6,780,097 B2 | | 8/2004 | Shuttleworth et al. |
| 7,334,834 B2 | | 2/2008 | Hill et al. |
| 7,726,142 B2 | | 6/2010 | Keen |
| 8,056,355 B2 | | 11/2011 | Bruss et al. |
| 2007/0205633 A1 | | 9/2007 | Waco |

FOREIGN PATENT DOCUMENTS

| | | |
|---|---|---|
| WO | 2009136698 | 11/2009 |
| WO | 2013037335 | 3/2013 |
| WO | 2015065495 | 5/2015 |

* cited by examiner

*Primary Examiner* — Dennis H Pedder

(57) ABSTRACT

A roof for a cab of a machine includes a roof surface with a rearward incline having a front portion higher than a rear portion. The roof surface has a recessed portion at the rear portion that receives a Heating Ventilation and Cooling (HVAC) unit. The recessed portion includes a rearward facing sidewall with a rearward incline, such that an upper end of the rearward facing sidewall is closer to the front portion than a lower end. The rearward facing sidewall has a lateral opening, a pair of lateral sidewalls, and a base with a rearward incline, such that a front end of the base is higher than a rear end. The base has an upright opening with a ridge protruding upward, defining a perimeter of the upright opening. The rearward facing sidewall, the pair of lateral sidewalls, and the base, define a contiguous peripheral portion of the recessed portion.

2 Claims, 5 Drawing Sheets

US 9,550,407 B2

HVAC INTEGRATED ROOF FOR OPERATOR CABS

TECHNICAL FIELD

The present disclosure relates generally to a roof of an operator cab in a construction machine. More specifically, the present disclosure relates to a structure of the roof, which is integrated with a heating ventilation and air conditioning (HVAC) unit.

BACKGROUND

Operator cabs in construction machines, such as motor graders, are commonly provided with roofs with integrated heating ventilation and air conditioning (HVAC) units. Roofs with such provisions should satisfy a number of requirements. Among the many, a roof is needed to seal the cabin from outside weather. Further, roofs should provide ample overhead clearance for an operator stationed within the cabin, but is also required to be relatively compact so as to contain any excessive increase in the machine's overall height, and be in compliance with conventional storage and shipping requirements. Additionally, roofs are supposed to house various components of the HVAC unit, which include electrical/electronic items, electrical routings, controllers, blowers, heaters, evaporator cores, and several other accessories and components. With the HVAC unit integrated into the roof, it is generally a challenge to meet each of these conditions.

As additions to the above noted challenges, currently applied HVAC units in roofs of construction machines are generally exposed to frontal and overhead impacts. As a result, there is an increased vulnerability of damage to the HVAC units. Moreover, it remains pertinent to trade dress the roof and make an overall structure of the operator cab aesthetically appealing, while also making the configuration utilitarian for the operator stationed inside the operator cab. HVAC units may be positioned within the operator cab, but this may unduly use up cabin space, and inevitably restrict the operator's movement and may affect cabin ergonomics.

United States Patent Application US 20070205633 relates to a roof system for an agricultural vehicle, such as a tractor, with integrated heating ventilation and cooling (HVAC) ducting. However, a focus of the '633 reference is to enhance an operator's visibility outside the agricultural vehicle. Further, a configuration of an HVAC ducting discussed in the '633 reference probably remains vulnerable to frontal and overhead impacts owing to the position provided for the HVAC ducting. Moreover, it is also pertinent to provide for an effective containment of condensed water, in and around HVAC units, from an undue drainage into the operator cab, a discussion to which is missing in the '633 reference.

Accordingly, the system and method of the present disclosure solves one or more problems set forth above and other problems in the art.

SUMMARY OF THE INVENTION

Various aspects of the present disclosure illustrate a roof for a cab of a machine. The roof includes a roof surface having a rearward incline such that a front portion of the roof is higher in elevation than a rear portion. The roof surface includes a recessed portion at the rear portion, which is configured to receive an external Heating Ventilation and Cooling (HVAC) unit. The recessed portion is defined by a rearward facing sidewall having a rearward incline such that an upper end of the rearward facing sidewall is in closer proximity to the front portion than a lower end. The rearward facing sidewall has a lateral opening. Further, a pair of lateral sidewalls, and a base that has a rearward incline such that a front end of the base is higher in elevation than a rear end of the base. The base includes an upright opening, with a ridge protruding upward from the base and defines a perimeter of the upright opening. The rearward facing sidewall, the pair of lateral sidewalls, and the base, together define a contiguous peripheral portion of the recessed portion.

DETAILED DESCRIPTION

Figure 1:
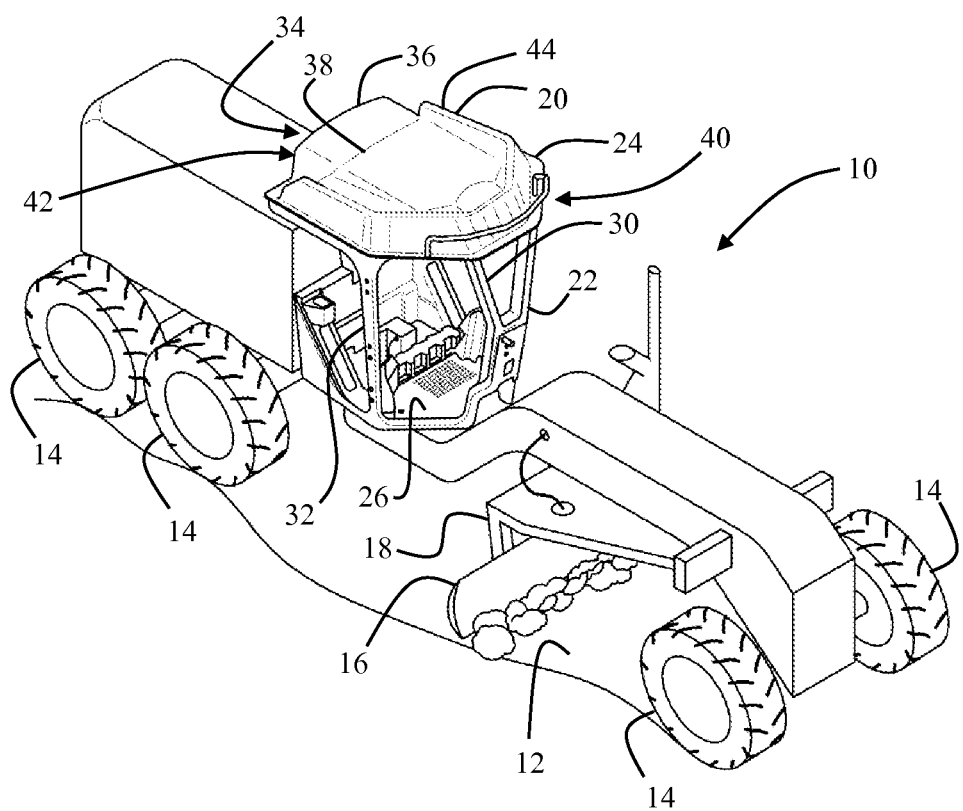
FIG. 1 is an isometric view of an exemplary motor grader with an operator cab installed with a roof, in accordance with the concepts of the present disclosure.

Referring to FIG. 1, there is shown an exemplary motor grader machine 10. For ease in reference, the motor grader machine 10 will be simply referred to as a machine 10, hereinafter. The machine 10 generally operates over a non-paved surface 12 and grades the non-paved surface 12 to create a generally flat top layer during a grading process. It is contemplated, however, that the machine 10 could alternatively embody other machine types, such as a backhoe, a front shovel, a dozer, or another similar machine. The machine 10 is powered by an engine system (not shown) and includes several wheels 14 that facilitate transport of the machine 10 to different locations. Optionally, the machine 10 may be a tracked machine. The machine 10 also includes, among other components, one or more ground engaging tools (GETs), for example, a blade 16, etc., that perform desired tasks over the non-paved surface 12. The blade 16 may be coupled to the machine 10 by a linkage and cylinder assembly 18 that may be independently controlled to move (rotate, translate, etc.) the blade 16 to a variety of different positions and configurations, relative to machine 10. The machine 10 may be driven, and various tools of the machine 10 may be controlled, by an operator positioned in an operator cab 20. The operator cab 20 may be simply referred to as a cab 20, hereinafter. Typically, the operator controls and monitors the movement of the blade 16 and other GETs to prevent an undue contact of the blade 16 with the components or wheels 14 of the machine 10.

Figure 2:
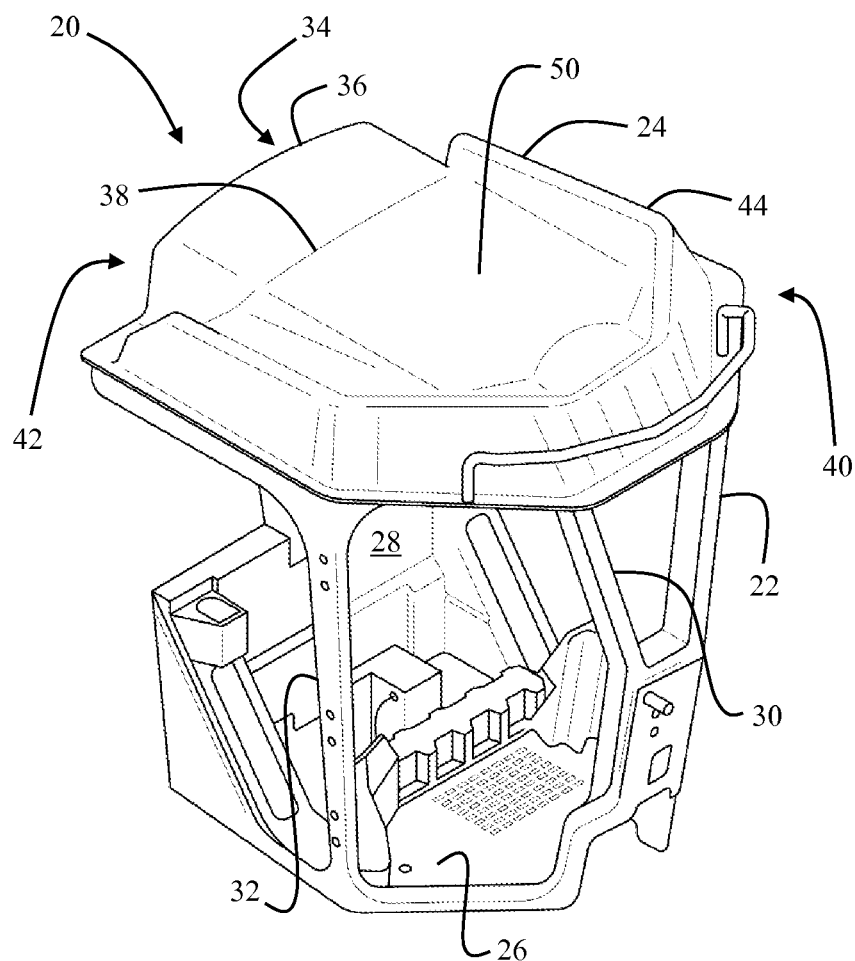
FIG. 2 is an enlarged view of the roof with the operator cab of FIG. 1.

Referring to FIGS. 1 and 2, the cab 20 may include a seat (not shown) for an operator to sit on while operating the machine 10. Although not shown, the cab 20 may also house control devices, such as joysticks, and other instrumentation, such as consoles and communication systems that enable the operator to drive and operate the machine 10 and the GETs (blade 16) of the machine 10. Typically, these control devices are positioned within easy reach and sight of the operator within the cab 20. Further, the cab 20 is structured relative to a frame 22 that defines a generally cross-cut polygonal profile of the cab 20, from varied view angles, as shown. In general, the configuration of the cab 20 may be adapted to increase the operator's visibility and comfort while providing the desired structural strength. To increase comfort, the components of the frame 22 may be adapted to increase the space available for the operator within the cab 20, but without reducing and affecting the space needed for other sub-systems of the machine 10.

The cab 20 includes a roof 24 and a floor 26. The roof 24 and the floor 26 are connected to each other by multiple posts so as to enclose a cab volume 28 (FIG. 2). These posts may be categorized into A-post 30 and B-post 32. To increase visibility, the A-post 30 and the B-post 32 may be arranged to minimize obstruction of the operator's line of sight to the GETs and surroundings components. These posts 30 and 32 may support at least one of a substantially transparent material, an opaque material portion, or a combination of the two, therebetween, so as to define outer wall portions of the cab 20. The cab 20 may be provided with a rollover protection system (ROPS), which may be integrated with portions of the frame 22. In case of a rollover, the ROPS facilitates absorption of an energy of impact and prevents the cab 20 from being deformed and crushed because of the forces of impact. Similarly, a rigidity of a structure of the cab 20 is also applicable in environments where there is an increased possibility of objects falling onto the roof 24. Accordingly, the structure of the roof 24 and the cab 20 may be incorporated with falling objects protective structures (FOPS), as is customarily known.

The floor 26 is configured to be generally planar and allows an operator to be comfortably stationed within the cab volume 28. The floor 26 may include provisions to accommodate a number of electronic and hydraulic equipment that are associated with various operational aspects of the machine 10. The floor 26 may also house measures that are fit to route one or more electrical wiring and hydraulic channels across an associated floor space. The floor 26 is generally integrally attached with the posts 30 and 32, however, it is contemplated that the posts 30 and 32 are attached to the floor 26 through other means such as by conventionally available fastener units.

Similarly, the roof 24 of the cab 20 supports and maintains the structure of the cab 20 and imparts the cab 20 with a substantial rigidity so as to assist in the prevention of deformation in the event of a rollover, as already noted. As with the floor 26, the roof 24 may be integrally attached to the posts 30 and 32, however, the posts 30 and 32 may be separable from the roof 24, in some embodiments. The roof 24 is positioned overhead and allows the cab volume 28 to be enclosed from outside weather, dust, and the general harshness, found in operational environments. The roof 24 is adapted to integrally accommodate an external heating ventilation and air conditioning (HVAC) unit 42 towards a rear portion 34 of the roof 24. Further, a cover portion 36 is provided that facilitates a covering of the HVAC unit 42 and imparts the roof 24 with a substantially seamlessly flowing structural profile, which is aesthetically pleasing and appealing. As shown, the cover portion 36 has a peripheral edge 38 that facilitates as assembly of the cover portion 36 with the rear portion 34 of the roof 24.

Figure 3:
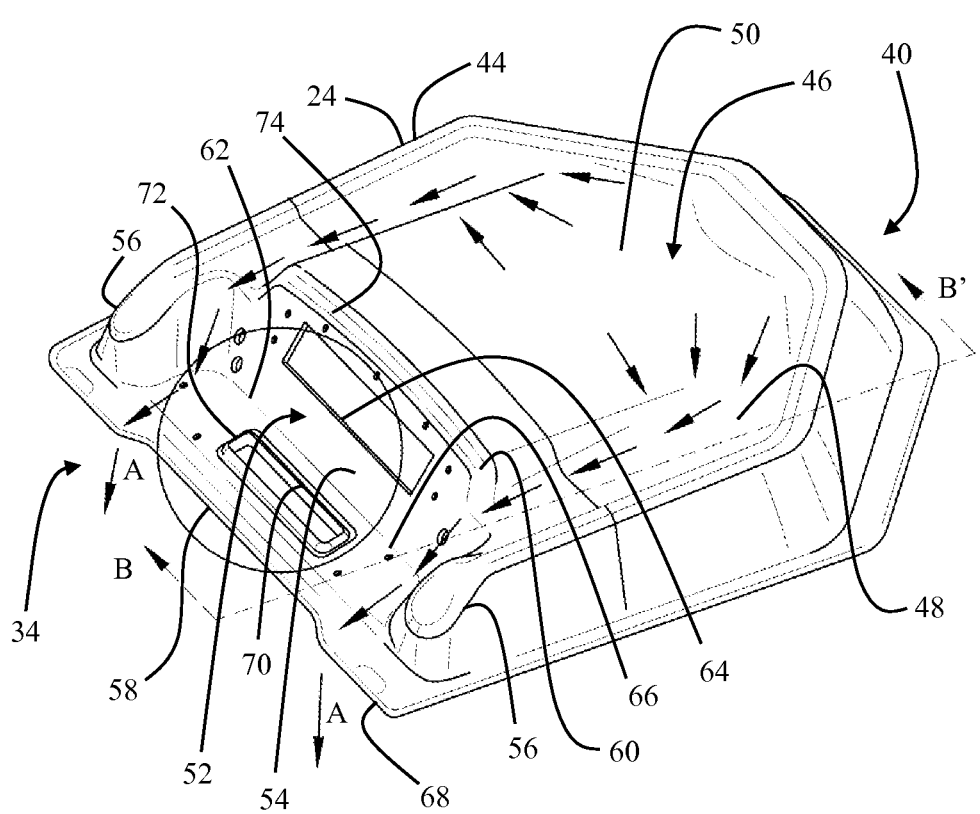
FIG. 3 is a rear pictorial view of the roof of the operator cab of FIG. 1 that depicts structural features of the roof, in accordance with the concepts of the present disclosure.

Referring to FIGS. 2 and 3, the roof 24 may be visualized from the front as well as from the rear. The roof 24 includes a front portion 40 as well. The front portion 40 adheres with a front of the machine 10, while the rear portion 34 adheres with the rear of the machine 10. When viewing the front isometric view of the roof 24 (as in FIG. 2), the roof 24 defines a generally U-shaped structure, with a ridgeline 44 being defined substantially halfway about a perimeter portion of the roof 24 Inner portions of the structure of the roof 24 include an embossed portion defined by a central bulge 46 and an intermediate depressed portion 48 that stands as the interface between the ridgeline 44 and the central bulge 46. Generally, the intermediate depressed portion 48 runs along a length of the roof 24 (best seen in FIG. 5), on each of the lateral sides of the roof 24, and merges with the central bulge 46 towards the front portion 40. A higher elevation of the intermediate depressed portion 48 is defined at the front portion 40 and a lower elevation is defined at the rear portion 34. Cumulatively, the ridgeline 44, the central bulge 46, and the intermediate depressed portion 48, defines a unitarily formed top surface of the roof 24, referred to as a roof surface 50. Given the profile of the intermediate depressed portion 48, the roof surface 50 is inclined to the rear portion 34, and, in so doing, the front portion 40 of the roof 24 is imparted with a relatively higher elevated stance than the rear portion 34 of the roof 24.

Figure 4:
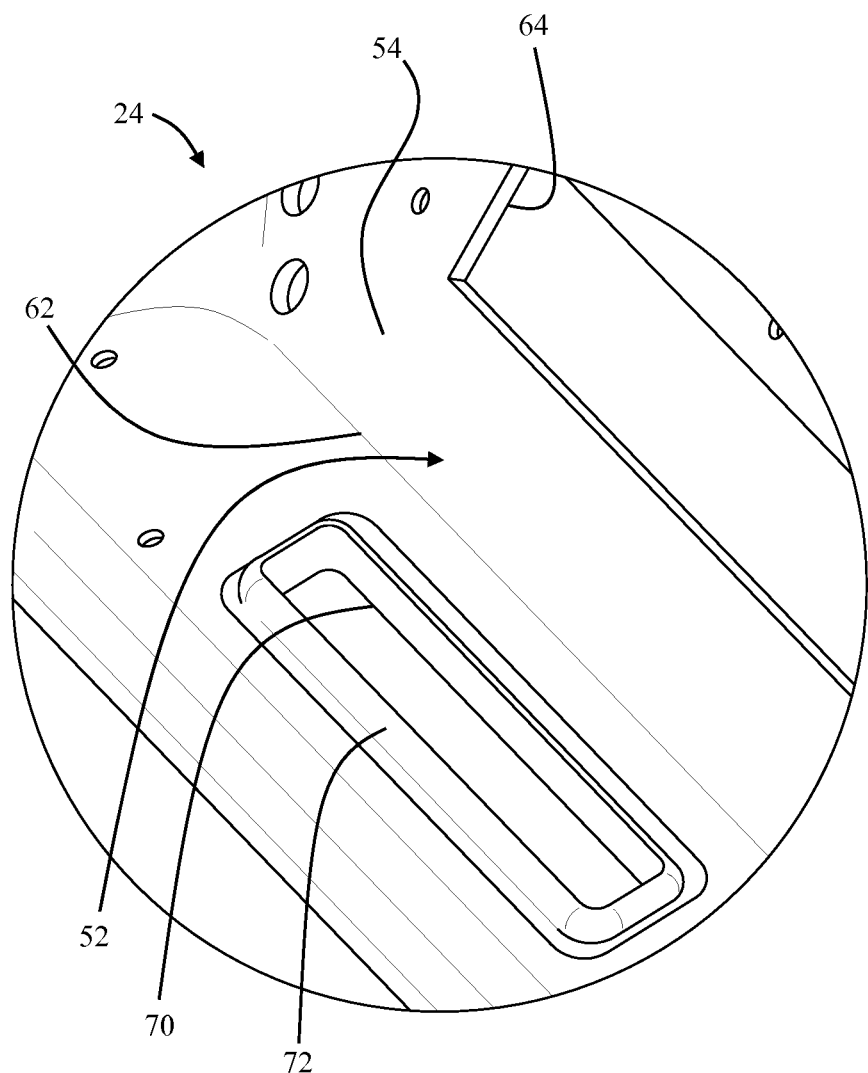
FIG. 4 is a magnified portion of the rear isometric view of FIG. 3, depicting a ridge of an upright opening formed in the roof, in accordance with the concepts of the present disclosure.

Referring to FIGS. 3 and 4, the roof surface 50 includes a recessed portion 52 at the rear portion 34, as shown. The recessed portion 52 is configured to receive the HVAC unit 42. The recessed portion 52 is defined by a rearward facing sidewall 54, a pair of lateral sidewalls 56, and a base 58.

The rearward facing sidewall 54 is integral with the roof surface 50 and is generally formed as a bent planar structure extended from the central bulge 46. The rearward facing sidewall 54 has a rearward incline that resembles conventional waterfall dashboard consoles. The rearward facing sidewall 54 includes an upper end 60 and a lower end 62. A profile of the rearward facing sidewall 54 is such that the upper end 60 is nearer to the front portion 40 of the roof 24 than the lower end 62. Additionally, the rearward facing sidewall 54 has a lateral opening 64. The lateral opening 64 allows the HVAC unit 42 to facilitate delivery of conditioned air into the cab volume 28.

As with the rearward facing sidewall 54, the base 58 is also formed as a bent piece, integrally extended further rearwardly from the rearward facing sidewall 54. Additionally, the base 58 has a rearward incline as well. The rearward incline is defined in such a way that a front end 66 of the base 58 (in line with the lower end 62 of the rearward facing sidewall 54) is elevated slightly higher than a rear end 68 of the base 58. Further, the base 58 includes an upright opening 70, which is similar to the lateral opening 64 formed in the rearward facing sidewall 54. In general, the upright opening 70 allows venting of air from within the cab volume 28 into the HVAC unit 42, so as to facilitate air recirculation and subsequently be returned to the cab volume 28 as conditioned air. The returned air supply may be facilitated through the lateral opening 64. However, a flow pattern of the air may be reversed, and it may happen that the lateral opening 64 receives air while the upright opening 70 delivers air. A ridge 72 protrudes upwards from the base 58 and defines a perimeter of the upright opening 70 (best shown in FIG. 4). The upward protrusion of the ridge 72 imparts the ridge 72 with an elevation that facilitates prevention of water, which may be formed during a condensation process of the HVAC unit 42, or during rains, or during a washing cycle, from seeping into the cab volume 28 through the upright opening 70.

The pair of lateral sidewalls 56 are defined with each wall being integrally extended from the ridgeline 44, towards the rear portion 34, and seamlessly merging into the rearward facing sidewall 54 and the base 58, as shown. In general, the pair of lateral sidewalls 56 are longitudinal in arrangement relative to the roof 24 and are substantially perpendicular to the lateral opening 64. In that manner, the pair of lateral sidewalls 56 form stiffener portions of the roof 24 (or the recessed portion 52), imparting rigidity to the overall structure of the roof 24.

As may be seen by way of the aforementioned description, each of the disclosed feature of the roof 24 is integral to the roof 24. In that way, the roof 24 may be manufactured from a single or multiple piece of sheet metal that may undergo series of shearing, stamping, bending, embossing, and deep drawing operations. Moreover, the feature list comprising the rearward facing sidewall 54, the pair of lateral sidewalls 56, and the base 58, define a contiguous peripheral portion 74 of the recessed portion 52 to which the peripheral edge 38 of the cover portion 36 may comply with. Seals (not shown) may be provided at the contiguous peripheral portion 74 or the peripheral edge 38 so as to affirm a sealed engagement between the cover portion 36 and the recessed portion 52. An engagement between the recessed portion 52 and the cover portion 36 may be affirmed through a snap fit arrangement, although other connection types, such as those involving a slide fit, assembly fit, etc., may be contemplated. As a result, the cover portion 36 may be assembled to the recessed portion 52 of the roof 24, in order to resemble a unitary roof structure.

Figure 5:
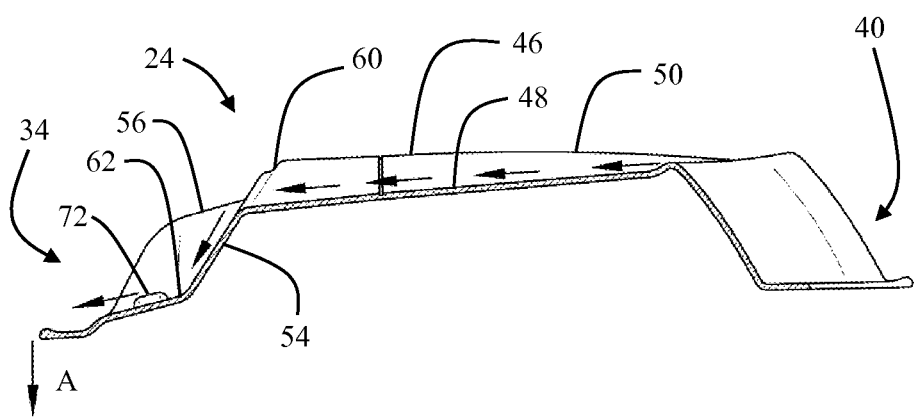
FIG. 5 is a side cross-sectional view of the roof of FIG. 1, depicting certain structural features and profile pertaining to a drain flow path defined by the roof, in accordance with the concepts of the present disclosure.

Referring to FIG. 5, a side view profile of the roof 24 is shown. This side view profile is shown by means of a cross-section cut along a section B-B' (FIG. 3) of the roof 24. By way of this view, the elevated front portion 40 of the roof 24 relative to the rear portion 34 may be better visualized. Moreover, a proximity of upper end 60 of the rearward facing sidewall 54 to the front portion 40 of the roof 24 than the lower end 62 is better shown. Similarly, a profile of the base 58 is also depicted to define the higher front end 66 than the relatively lowered rear end 68.

INDUSTRIAL APPLICABILITY

In operation, the roof 24 is subject to a variety of environmental conditions. During rains and snow, for example, when water and ice is splashed onto the roof surface 50, the inclined profile of the roof 24 restricts a resulting presence of water from being accumulated over the roof 24, and rather, urges the overlying water to flow down by gravity feed towards the rear portion 34 (or recessed portion 52). An associated flow direction is visualized by examining arrow, A, in FIG. 5. Although the recessed portion 52 is sealed from the outside and enclosed by way of the cover portion 36, in the unlikely event, if water seeps past the sealed enclosure and enters the recessed portion 52, the ridge 72 formed at the perimeter forms a deterrence against introduction and further drainage of the inflowing water into the cab volume 28. Moreover, the recessed portion 52 may also be subject to the presence of water owing to the condensation processes executed by the HVAC unit 42. However, given the provision of the ridge 72 at the perimeter of the upright opening 70 and the inclined design of the base 58, water is restricted from a drain past the ridge 72. Instead, water flows further along the gravity feed direction (arrow, A, FIGS. 3 and 5), and ultimately out from the rear portion 34 of the roof 24, as shown. Furthermore, by diverting water to the rear portion 34 of the roof 24, a water run-off is substantially absent from the front portion 40. This is beneficial since the front portion 40 is generally in engagement with one or more windows (not shown) of the cab 20, and it remains increasingly possible that such windows stay relatively free from the effects of water run-offs. Such diversion of water also mitigates an impact on the operator's visibility through such windows. Additionally, as the HVAC unit 42 is positioned at the rear portion 34 of the roof 24, the HVAC unit 42 remains relatively less exposed to impacts from the front portion 40.

The features described in the present disclosure are applicable to multiple environments and different machines. Therefore, operator cabs in multiple applications may suitable apply one or more of the concepts of the present disclosure. Accordingly, the environment and features discussed here need not be viewed as being limiting in any way.

It should be understood that the above description is intended for illustrative purposes only and is not intended to limit the scope of the present disclosure in any way. Thus, one skilled in the art will appreciate that other aspects of the disclosure may be obtained from a study of the drawings, the disclosure, and the appended claim.

What is claimed is:

1. A roof for a cab of a machine, the roof comprising:
a roof surface having a rearward incline such that a front portion of the roof is higher in elevation than a rear portion, the roof surface including a recessed portion at the rear portion, the recessed portion configured to receive an external Heating Ventilation and Cooling (HVAC) unit, the recessed portion being defined by:
a rearward facing sidewall having a rearward incline such that an upper end of the rearward facing sidewall is in closer proximity to the front portion than a lower end, the rearward facing sidewall having a lateral opening formed therein;
a pair of lateral sidewalls, and
a base having a rearward incline such that a front end of the base is higher in elevation than a rear end of the base, the base including an upright opening formed therein, the base having a ridge protruding upward from the base, the ridge defining a perimeter of the upright opening,
wherein the rearward facing sidewall, the pair of lateral sidewalls, and the base, define a contiguous peripheral portion of the recessed portion.

2. The roof of claim 1 further comprising an HVAC cover unit that has a peripheral edge conforming to the contiguous peripheral portion of the recessed portion.

* * * * *